United States Patent
Neuerburg et al.

[11] Patent Number: 5,852,921
[45] Date of Patent: Dec. 29, 1998

[54] MOWER WITH IMPROVED WINDROWING DEVICE

[75] Inventors: Horst Neuerburg, Saverne; Rene Walter, Goetzenbruck; Michel Wolff, Mommenheim, all of France

[73] Assignee: Kuhn S.A., Saverne Cedex, France

[21] Appl. No.: 679,159

[22] Filed: Jul. 10, 1996

[30] Foreign Application Priority Data

Jul. 13, 1995 [FR] France .................................. 95 08701

[51] Int. Cl.$^6$ .................................................. A01D 34/66
[52] U.S. Cl. ................................... 56/6; 56/153; 56/192; 56/193; 56/DIG. 5; 56/DIG. 21
[58] Field of Search .................................. 56/6, 192, 193, 56/153, DIG. 5, DIG. 21

[56] References Cited

U.S. PATENT DOCUMENTS

| | | | |
|---|---|---|---|
| Re. 34,417 | 10/1993 | Werner et al. .............................. | 56/6 X |
| 3,443,369 | 5/1969 | Zweegers ................................ | 56/192 X |
| 3,772,865 | 11/1973 | Ruprecht et al. .......................... | 56/192 |
| 4,160,356 | 7/1979 | Mathews .................................. | 56/192 |
| 4,238,917 | 12/1980 | Oosterling et al. ........................ | 56/192 |
| 4,244,163 | 1/1981 | Gantzer et al. ............................ | 56/192 |
| 4,343,138 | 8/1982 | Neuerburg . | |
| 4,426,828 | 1/1984 | Neuerburg ................................ | 56/6 X |
| 4,428,185 | 1/1984 | Toillie et al. ........................... | 56/192 X |
| 4,443,998 | 4/1984 | Neuerburg ................................ | 56/13.6 |
| 4,452,034 | 6/1984 | Neuerburg . | |
| 4,525,987 | 7/1985 | Werner et al. . | |
| 4,557,104 | 12/1985 | Toillie et al. ............................ | 56/6 X |
| 4,610,128 | 9/1986 | Ermacora . | |
| 4,633,656 | 1/1987 | Willinger ................................ | 56/6 X |
| 4,669,256 | 6/1987 | Ermacora et al. . | |
| 4,694,640 | 9/1987 | Ermacora et al. . | |
| 4,714,123 | 12/1987 | Ermacora et al. . | |
| 4,719,742 | 1/1988 | Ermacora et al. . | |
| 4,720,964 | 1/1988 | Ermacora et al. ........................ | 56/6 X |
| 4,723,396 | 2/1988 | Ermacora . | |
| 4,730,445 | 3/1988 | Wolff . | |
| 4,761,940 | 8/1988 | Wolff . | |
| 4,763,463 | 8/1988 | Ermacora et al. ........................ | 56/6 X |
| 4,771,591 | 9/1988 | Ermacora ................................ | 56/6 X |
| 4,809,488 | 3/1989 | Neuerburg et al. ................... | 56/192 X |
| 4,811,553 | 3/1989 | Ermacora et al. ........................ | 56/6 X |
| 4,833,868 | 5/1989 | Ermacora et al. ........................ | 56/6 X |

(List continued on next page.)

FOREIGN PATENT DOCUMENTS

| | | |
|---|---|---|
| 2317869 | 2/1977 | France . |
| 2377759 | 8/1978 | France . |
| 2419006 | 10/1979 | France . |
| 2147056 | 5/1972 | Germany . |
| 3501133 | 7/1986 | Germany . |
| 2023393 | 1/1980 | United Kingdom . |

*Primary Examiner*—Terry Lee Melius
*Assistant Examiner*—Christopher J. Novosad
*Attorney, Agent, or Firm*—Oblon, Spivak, McClelland, Maier & Neustadt, P.C.

[57] ABSTRACT

A mower includes a linking structure designed to link the mower to a motor vehicle; a cutting mechanism with driven cutting elements that include cutting tools; and a windrowing device designed to move laterally, toward a median plane of the cutting mechanism, the product that has been cut by the cutting elements before it is dropped to the ground. The windrowing device has at least one guiding element for the cut product, located in the vicinity of one of the lateral ends of the cutting mechanism, and considering the direction of work, behind the front of the cut of the cutting mechanism. The guiding element has at least two rotors arranged crosswise to the direction of work and to the rotation axis directed upward during work. The rotors are hung to a carrying structure linked to the cutting mechanism and/or to the linking structure, and the rotors are driven in rotation by way of a driving mechanism. The rotors are windrowing rotors that are arranged in the immediate vicinity of one another and are hung to the carrying structure from their top, and the lower end of a windrowing rotor extends at least to the cutting plane defined by the cutting tools of the corresponding cutting elements.

23 Claims, 5 Drawing Sheets

5,852,921
Page 2

U.S. PATENT DOCUMENTS

| | | | |
|---|---|---|---|
| 4,848,069 | 7/1989 | Ermacora et al. | |
| 4,879,870 | 11/1989 | Neuerburg | 56/6 X |
| 4,896,493 | 1/1990 | Neuerburg | 56/6 X |
| 4,899,523 | 2/1990 | Frumholtz et al. | 56/192 X |
| 4,903,468 | 2/1990 | Haberkorn | |
| 4,909,023 | 3/1990 | Haberkorn et al. | 56/6 X |
| 4,922,693 | 5/1990 | Neuerburg | |
| 4,947,629 | 8/1990 | Ermacora et al. | 56/6 X |
| 4,970,848 | 11/1990 | Neuerburg et al. | |
| 4,974,399 | 12/1990 | Haberkorn | 56/6 |
| 4,986,061 | 1/1991 | Frumholtz et al. | 56/6 |
| 4,986,064 | 1/1991 | Ermacora | |
| 4,991,383 | 2/1991 | Ermacora | 56/192 X |
| 4,999,981 | 3/1991 | Neuerburg | 56/6 |
| 5,060,462 | 10/1991 | Helfer et al. | |
| 5,094,063 | 3/1992 | Wattron et al. | 56/6 |
| 5,101,616 | 4/1992 | Wolff | |
| 5,107,662 | 4/1992 | Haberkorn et al. | 56/6 X |
| 5,107,663 | 4/1992 | Wattron et al. | |
| 5,136,828 | 8/1992 | Ermacora | |
| 5,199,249 | 4/1993 | Wattron et al. | |
| 5,199,250 | 4/1993 | Ermacora et al. | |
| 5,241,809 | 9/1993 | Wolff et al. | |
| 5,353,579 | 10/1994 | Wolff | 56/6 X |
| 5,353,580 | 10/1994 | Wolff | 56/6 X |
| 5,357,737 | 10/1994 | Ermacora et al. | |
| 5,417,042 | 5/1995 | Walch et al. | 56/6 |
| 5,419,106 | 5/1995 | Gemelli | |
| 5,423,165 | 6/1995 | Walch et al. | 56/6 |
| 5,507,136 | 4/1996 | Walch | 56/6 |

MOWER WITH IMPROVED WINDROWING DEVICE

BACKGROUND OF THE INVENTION

1. Field of the Invention

The present invention relates to a mower that includes a linking structure designed to link said mower to a motor vehicle; a cutting mechanism with animated cutting elements that comprise cutting tools; and a windrowing device designed to move sideways, toward the median plane of the cutting mechanism median, the product that has been cut by the cutting elements before having been dropped to the ground. The windrowing device has at least one guiding element for the cut forage, located in the proximity of one of the lateral ends of the cutting mechanism, and considering the direction of advance at work, behind the cutting front of the cutting mechanism. The guiding element has at least two rotors that are located crosswise to the forward direction of the work and to rotational axes which are upwardly directed during work. The rotors are hung on a carrying structure linked to the cutting mechanism and/or to the linking structure, with the rotors being driven in rotation by a driving mechanism.

2. Discussion of the Background

A related mower in the technical field is illustrated in document FR 2 317 869, and has a cutting mechanism and a windrowing device that are located in the proximity of one of the lateral ends of the cutting mechanism.

This windrowing device has a flexible windrowing strip that is guided by two rotors that are arranged crosswise to the direction of advance at work and to the upwardly directed rotational axis. The first rotor is fastened in a concentric way on the cutting element that is nearest to the lateral end of the cutting mechanism close to which is located the windrowing device, while the second rotor is set in free rotation. The cutting element, closest to the lateral end of the cutting mechanism, is driven by a rotating movement such as to cut the product, and throw it toward the median part of said cutting mechanism. The first rotor that is fastened to this cutting element drives the flexible windrowing strip in the same rotation direction as the said cutting element, allowing to windrow the cut product more.

However, this windrowing device has two major disadvantages.

A first disadvantage of this related windrowing device is in the rotation speed of the windrowing strip. The first rotor that is fastened to the cutting element rotates at the same speed as the cutting element. This speed is too high for the windrowing strip because at that speed it slides on the cut forage without driving it for windrowing.

A second disadvantage of this windrowing device is because the cut product comes in contact with the loose side of the windrowing strip which is inconvenient because, during work, the flapping of said loose side does not allow a good contact of the cut product with said windrowing strip, which is detrimental to the proper operation of the mower.

To this effect, the document FR 2 419 006 is proposing to set the first rotor in free rotation and to drive the second rotor by means of a driving mechanism so that the tight side of the windrowing strip would be located on the side where the cut product flows. This driving mechanism is located in part within the first rotor and drives the second rotor at a different speed than the cutting elements of the cutting mechanism.

The driving mechanism has a coupling device with a pulley on which glides a belt that drives a pulley of greater diameter, and is linked in rotation with the second rotor, said belt extending in the inner part of the windrowing strip. To achieve this, the first rotor and the second rotor are both made of two parts between which the belt runs.

Considering that the first rotor extends above the cutting element which is the closest to the lateral end of the cutting mechanism, the windrowing strip extends above the cutting plane defined by the cutting tools of the corresponding cutting elements. Such a concept allows for part of the cut product to pass under the windrowing strip and will not be windrowed. Furthermore, such a concept with a windrowing strip, as above described, is relatively costly to develop, and is susceptible to pile ups. In fact, the windrowing strip and the rotors are directly exposed to the flow of cut product, which induces pile ups, especially when some of the cut product gets entangled between the windrowing strip and the rotors.

SUMMARY OF THE INVENTION

Accordingly, an object of the present invention is to develop a mower with a windrowing device that would efficiently gather the product cut with the cutting tools of the cutting mechanism on a broad width in a relatively narrow windrow, the windrowing device not being prone to pile ups, with a simple and compact concept, and inexpensive.

To achieve this, the rotors of the mower are windrowing rotors, located in the immediate proximity to each other and hanging only on the carrying structure from above, and the lower end of a windrowing rotor extends at least to the cutting plane that is defined by the cutting tools of the corresponding cutting elements.

According to an additional feature of the invention, the windrowing rotors of a same guiding element are arranged one in relation to the other, so that a horizontal line that leans on the front part of said windrowing rotors would extend, looking from above, toward the rear in the direction of the median plane of the cutting mechanism. Thanks to this feature, the flow of the cut product is guided toward the rear and toward the median plane of the cutting mechanism.

According to another additional feature of this invention, according to a view in the direction of the work, the windrowing rotor, located in the closest area of the median plane of the cutting mechanism, is at least somewhat tangent to the windrowing rotor located at the far end, or somewhat overlaps it in order to obtain a good seal between the two windrowing rotors and avoid that part of the cut product lodges between said windrowing rotors.

According to another further feature of this invention, at least the windrowing rotor, located the closest to the median plane of the cutting mechanism, has a casing especially directed upwardly and a lower part especially directed radially outward.

The lower part, radially directed outward, extends to the lower end of the adjacent windrowing rotor and is shaped like a cone trunk.

According to another further feature of the invention, the lower part of a windrowing rotor is made of a soft material that can follow the uneven surface of the ground and prevent part of the cut product from slipping away between the windrowing rotor and the ground.

According to another additional feature of the invention, the casing of the windrowing rotor, located farthermost outward, extends to the close proximity of the path that has been swept by the cutting tools of the corresponding cutting elements in order to allow the cut product to be handled by said windrowing rotor before it is dropped to the ground.

According to another additional feature of the invention, the rotation axis of the windrowing rotor, located the farthermost outward, extends at least substantially in the vertical plane that is directed according to the forward direction at work and extending half-way between the rotation axes and the corresponding cutting elements.

According to another additional feature of the invention, the outer cutting element, located at the end of the cutting mechanism where a guiding unit is provided, has a windrowing cap and by looking toward the direction of the work, the corresponding windrowing rotor, located the farthermost outward, is at least substantially tangent to said windrowing cap or substantially overlaps it in order to obtain a good seal between said cap and said windrowing rotor and prevent part of the cut product from slipping away between them.

According to another additional feature of the invention, the rotation axis of a windrowing rotor is at least substantially vertical.

According to another additional feature of the invention, the windrowing rotors are movable in height so as to adapt them to variable working conditions.

According to another additional feature of the invention, the casing of each windrowing rotor is at least approximately cylindrical.

According to another further feature of the invention, the casing of at least one of the windrowing rotors of a guiding element has driving elements that are distributed in a way that is at least substantially uniform and extend at least substantially according to a generating line of said casing. Thanks to these driving elements, the cut product is efficiently driven by the windrowing rotor(s) and does not slip on them.

According to another further feature of the invention, at least the casing of the windrowing rotor, located the closest to the median plane of the cutting mechanism, is provided with driving elements.

According to another further feature of the invention, the peripheral linear speed of the windrowing rotor, located the closest to the median plane of the cutting element, is equal to or greater than the peripheral linear speed of the windrowing rotor that is located the farthermost outward. Such a concept allows, especially when the peripheral linear speed of the windrowing rotor that is located the closest to the median plane of the cutting mechanism is greater, to pull the cut product coming from the windrowing rotor that is located the farthermost outward in the direction of the median plane in order to obtain a good discharge of said cut product.

According to another further feature of the invention, the driving mechanism of the windrowing rotors of a guiding element is located above said windrowing rotors in order to shield it from the cut product.

Preferably, the driving mechanism is located above the carrying structure.

According to another additional feature of the invention, the driving mechanism has a transmission belt that extends at least horizontally.

According to another additional feature of the invention, a guiding element is arranged at each lateral end of the cutting mechanism, these two elements of the guiding system forming the windrowing device. Such a configuration allows to displace the cut product at each lateral end of the cutting mechanism in the direction of the median plane in order to windrow more of the cut product.

Favorably, the driving mechanism of the guiding element, located at the end where the cutting mechanism is driven, receives the movement directly from the transmission that drives the cutting mechanism, while the driving mechanism of the guiding element, located at the other end of the cutting mechanism, receives the movement from the cutting mechanism.

Accordingly, the present invention provides for a mower that comprises a linking structure designed to link the mower to a motor vehicle; a cutting mechanism having lateral extremities, propelled cutting elements and cutting tools; and a windrowing device designed to laterally move, toward a medium plane of the cutting mechanism, a product that has been cut by the cutting elements before the cut product is dropped to the ground.

The windrowing device has at least one guiding element for the cut product that is located near one of the lateral ends of the cutting mechanism, and when viewing in a direction of work, behind a front of a cut of the cutting mechanism. The at least one guiding element has at least two rotors that are located crosswise to the direction of work and to a rotation axis directed upward during operation. The rotors are hung on a carrying structure linked to at least one of the cutting mechanism or the linking structure, and are driven into rotation by means of a driving mechanism.

The rotors are windrowing rotors that are arranged in an immediate vicinity of each other and hung to the bearing structure by their top. A lower end of at least one of the windrowing rotors extends to at least a cutting plane as defined by the cutting tools of the corresponding cutting elements.

BRIEF DESCRIPTION OF THE DRAWINGS

In describing the preferred embodiment of the present invention illustrated in the drawings, specified terminology is employed for the sake of clarity. However, the invention is not intended to be limited to the specific terminology so selected and it is to be understood that each specific element includes all technical equivalents which operate for a similar purpose.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
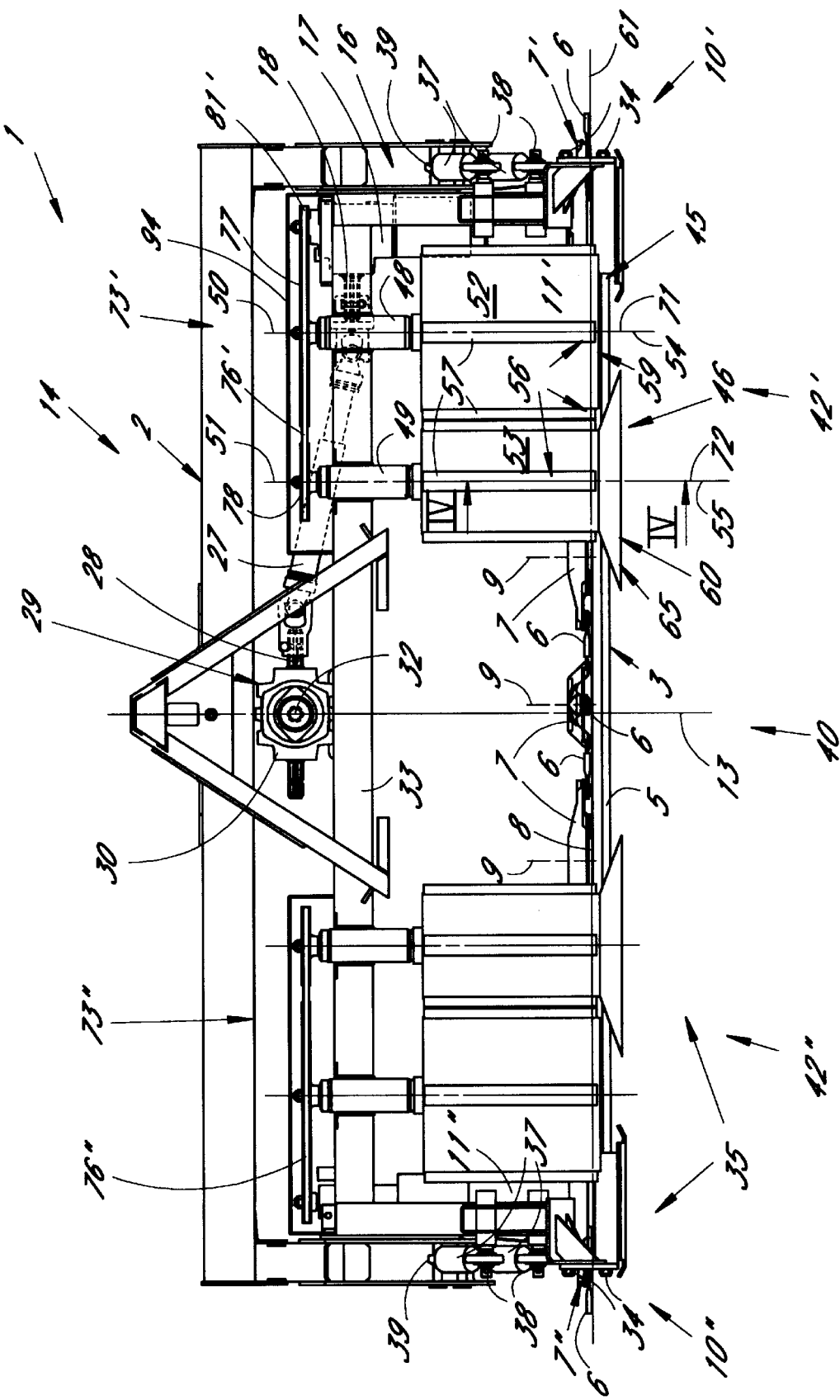
FIG. 1 represents a mower according to the invention from a rear view.
Figure 2:
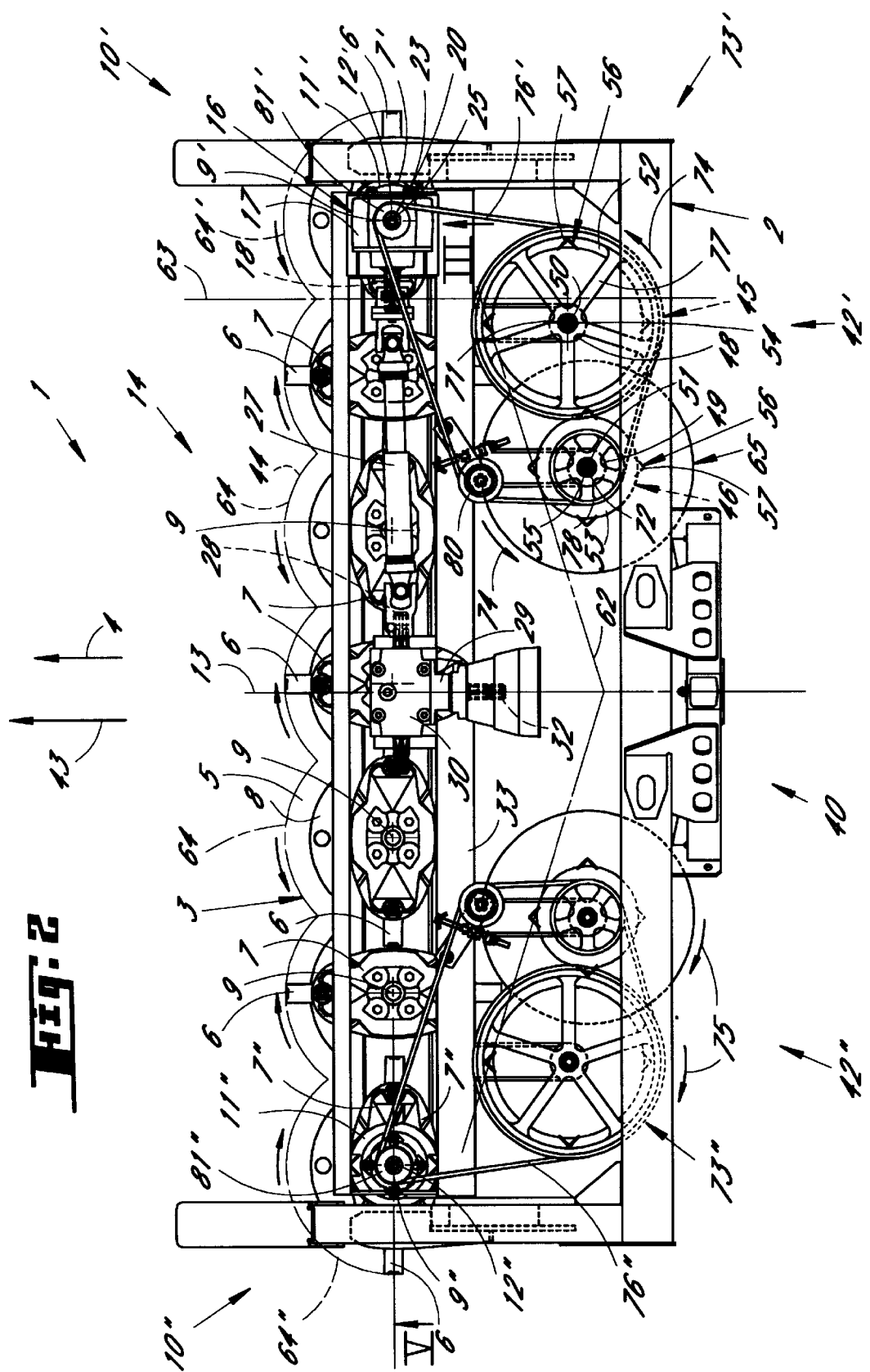
FIG. 2 represents a view from above of the mower that is represented in FIG. 1, without the protective hoods covering the driving mechanisms.

Referring now to the drawings wherein like reference numerals represent identical or corresponding parts throughout the several views, the mower (1) that is depicted in FIGS. 1 and 2 is, according to the example shown, a mower that is designed to be linked to the front part of a motor vehicle (not shown) by means of a linking structure (2). The mower (1) has a cutting mechanism (3) that extends, during work, crosswise to the forward direction (4) at work. The cutting mechanism (3) includes housing (5) that supports a few cutting elements (7, 7', 7") that extend at the upper face (8) of the housing (5). Each cutting element (5) includes cutting tools (6), and is designed to rotate around a respective, at least substantially vertical rotation axis (9, 9',9"). Each outer cutting element (7', 7") located at the corresponding lateral end (10', 10") of the cutting mechanism (3) has a windrowing cap (11', 11") arranged on top of corresponding cutting element (7', 7"). Each windrowing cap (11', 11") is cone-shaped, and is fastened to the corresponding cutting element (7', 7") in such a way that its corresponding median axis (12', 12") would be at least substantially merging with the rotation axis (9', 9") of the cutting element (7', 7").

These two windrowing tops (11', 11") rotate with the two outer cutting elements (7', 7") in a way such that the cut product would undergo a first windrowing toward the median plane (13) of the cutting mechanism (3).

Figure 3:
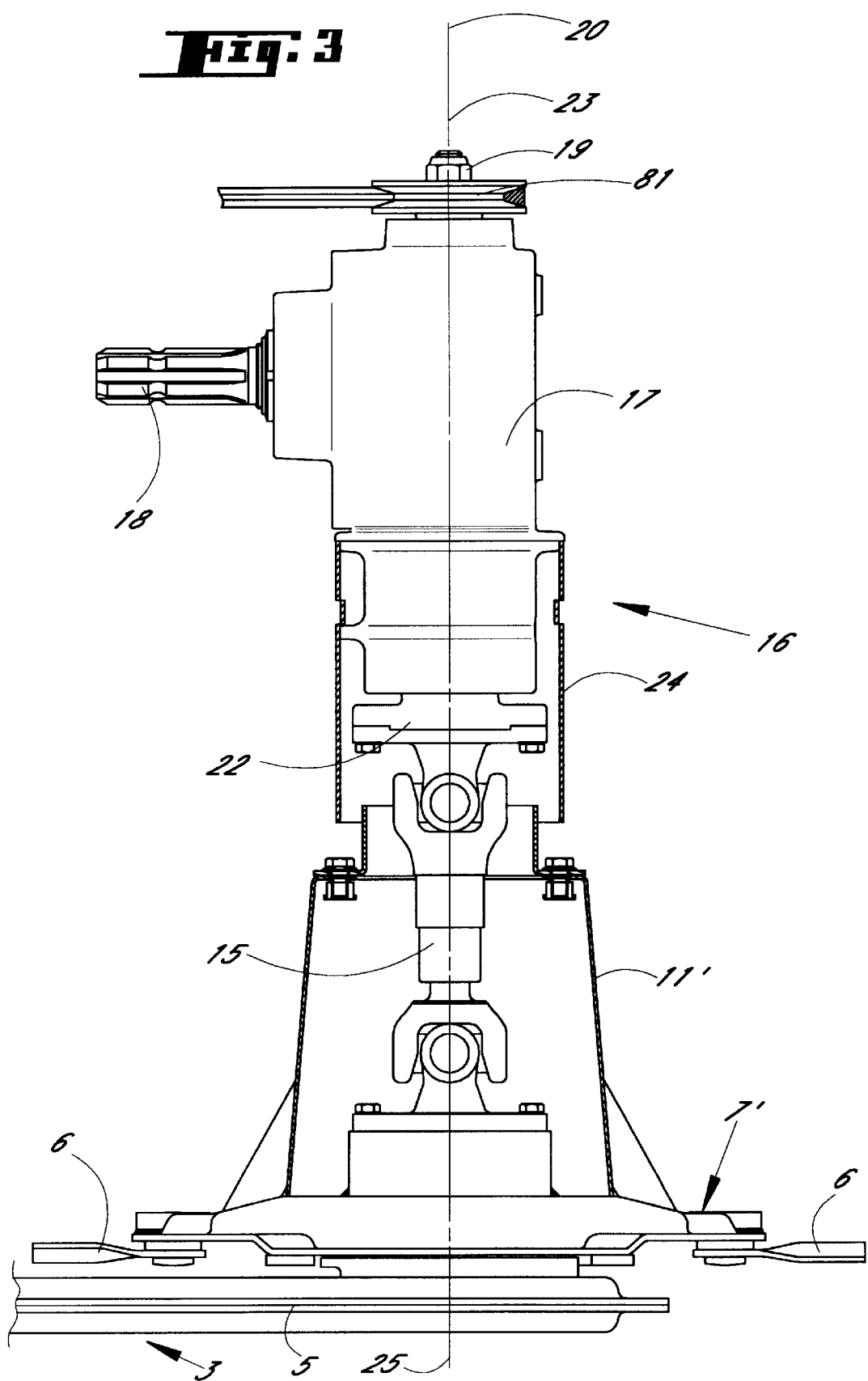
FIG. 3 represents, on a larger scale, a view from the rear following the arrow III that is defined in FIG. 2 of part of the transmission that moves the cutting mechanism, on which different partial sections have been made.

The drive that rotates the cutting elements (7, 7', 7") is produced by driving elements that are not shown, set in a fashion that is well-known in the field, within the housing (5) of the cutting mechanism (3). The drive that rotates these driving elements (7, 7', 7") is achieved by the first cutting element (7'), which receives the movement by a transmission (14). To that effect, we can see in FIG. 3 that the transmission (14) has a first transmission shaft (15) with universal joints that partially extends to the interior of the windrowing cap (11') and fastened both to the upper part of the first cutting element (7') and onto a first transmission device (16). The transmission device (16) has a housing (17), an entry shaft (18), an upper exit shaft (19) with an at least substantially vertical longitudinal axis (20) extending upward, and a lower exit shaft (22) with a longitudinal axis (23) that extends downward, which at least approximately merges with the longitudinal axis (20) of the upper exit shaft (19). The first transmission shaft (15) with universal joints is fastened to the lower exit shaft (22). Note that the longitudinal axes (20, 23) of the upper exit shaft (19) and the lower exit shaft (22) are at least approximately merging with the axis (9') of the first cutting element (7').

In the surrounding area of the lower part of the housing (17), a cylindrical shield (24) is provided that is designed to protect the lower exit shaft (22) and the first transmission shaft (15) with universal joints. To that effect, the shield (24) is fastened to the housing (17) and extends downward toward the windrowing cap (11') in such a way that it surrounds the part of the first transmission shaft (15) that extends outside of the windrowing cap (11'). Furthermore, note that the longitudinal axis (25) of the shield (24) is at least substantially merging with the rotation axis (9') of the first cutting element (7').

The transmission (14) includes as well a second transmission shaft (27) with universal joints (FIGS. 1 and 2) that is fastened both on the entry shaft (18) of the first transmission device (16) and to an exit shaft (28) belonging to a second transmission device (29). The second transmission device (29) is located at least substantially in the median plane (13) of the mower (1) and includes a housing (30) and an entry shaft (32) designed to receive a universal joint transmission shaft (not shown) coming from the motor vehicle (not shown). The mower (1), according to this invention, additionally includes a carrying structure (33) fastened to the cutting mechanism (3) by means of fastening elements (34).

The unit made up of the cutting mechanism (3)—carrying structure (33) is linked to the linking structure (2) by means of a linking device (35) that has four connecting rods (37) that form a trapeze, and a locking device (not shown).

The connecting rods (37) that form the trapeze are designed, during work, to allow some freedom to the unit made up of the cutting mechanism (3)—carrying structure (33) in relation to the linking structure (2) so that the cutting mechanism (3) can follow the uneven ground, the locking device (not shown) being designed to eliminate that freedom during the transport of the mower (1). Each connecting rod (37) is located at the corresponding lateral extremity (10', 10") of the cutting mechanism (3) and extends, during operation, forward and upward, and is linked to the linking structure (2) by means of a first joint (38) and to the carrying structure (33) by means of a second joint (39), the joints (38, 39) being of a spheric type.

The mower (1), according to the invention, includes as well a windrowing device (40) formed by two guiding elements (42', 42") each located at each lateral end (10', 10") of the cutting mechanism (3), and according to the direction of the work (43), behind the cutting front (44) of the cutting mechanism (3).

Each guiding element (42', 42") includes, according to the example shown, two windrowing rotors (45, 46) that are arranged crosswise to the direction of advance at work (4). Each windrowing rotor (45, 46) is hung to the carrying structure (33) by means of a corresponding cylindrical link (48, 49) with an at least substantially vertical longitudinal axis (50, 51).

Each windrowing rotor (45, 46) includes an at least substantially cylindrical housing (52, 53) especially directed upward, with a longitudinal axis (54, 55) which is at least substantially merging with the longitudinal axis (50, 51) of the corresponding cylindrical link (48, 49). Each housing (52, 53) includes driving elements (56) that are distributed in a way that is at least substantially uniform on the periphery of this latter. According to the example shown, the driving elements (56) are made of four driving ribs (57), angularly spaced to at least 90°. Each driving rib (57) is fastened to the periphery of the corresponding housing (52, 53) and extends along its longitudinal axis (54, 55).

In FIG. 1, one can notice that the lower ends (59, 60) of the windrowing rotors (45, 46) extend somewhat under the cutting plane (61) defined by the cutting tools (6) of the corresponding cutting elements (7, 7', 7").

Notice that the two windrowing rotors (45, 46) of the same guiding element (42', 42") are arranged in relation to each other in such a way that a horizontal line (62) that leans on the front part of the windrowing rotors (45, 46), extends, when viewed from above, toward the rear and toward the median plane (13) of the cutting mechanism (3).

According to the example that is shown, the housing (52) of the windrowing rotor (45) has a diameter that is greater than the housing (53) of the windrowing rotor (46). The housing (52) of the windrowing rotor (45) that is located outermost extends to the close vicinity of the trajectories (64, 64', 64") that are swept by the cutting tools (6) of the corresponding cutting elements (7–7', 7–7"). The longitudinal axis (50) of the cylindrical link (48) linking the windrowing rotor (45) that is located furthermost outward of the carrying structure (33) extends in the vicinity of the vertical plane (63). Vertical plane (63) is directed according to the direction of the work (4) and extending half-way between the rotation axis (9', 9") of the cutting element (7', 7") located furthermost outward of the cutting mechanism (3) and the rotation axis (9) of the cutting element (7) adjacent to the cutting element (7', 7"). Considering the diameter of the housing (52) of the windrowing rotor (45), according to a view along the direction of the work (4), it overlaps the windrowing cap (11', 11") that is fastened on the corresponding cutting element (7', 7") so that the innermost edge of the windrowing cap (11, 11') and the outermost edge of the windrowing rotor (45) are tangential.

The housing (53) of the windrowing rotor (46) that is located the closest to the median plane (13) of the cutting mechanism (3) is at least substantially tangent to the housing (52) of the windrowing rotor (45) located the furthermost outward of the cutting mechanism (3).

Figure 4:
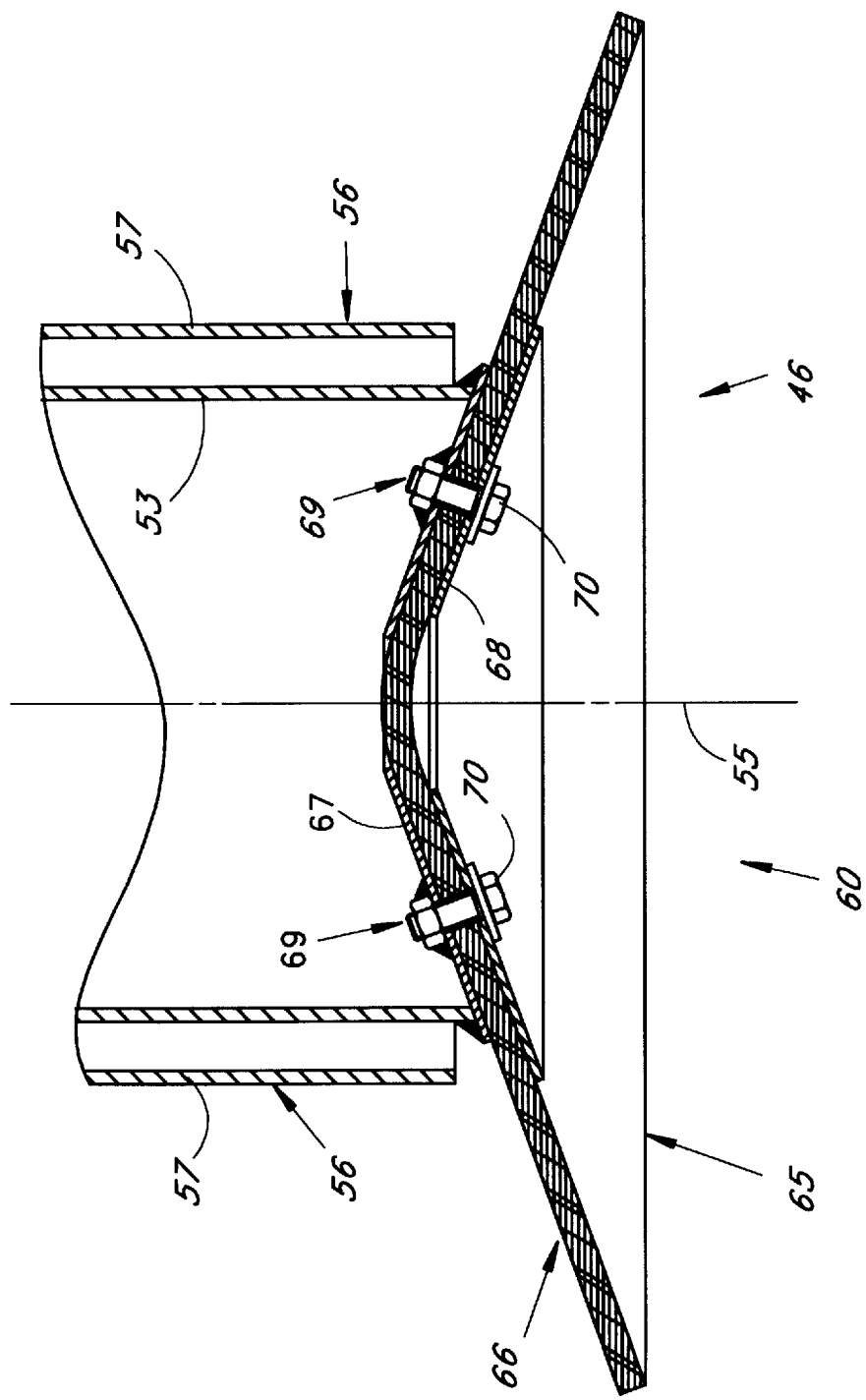
FIG. 4 represents a section by plane IV—IV defined in FIG. 1.

The windrowing rotor (46) additionally includes a lower part (65) that is essentially radially directed outward and that extends to the lower extremity (59) of the adjacent windrowing rotor (45). The lower part (65) has a truncated cone shape and includes a strip (66) made of flexible material (FIG. 4).

The strip (66) made of flexible material is fastened to the lower end (60) of the windrowing rotor (46) by means of a first sheet metal (67), shaped like a truncated cone, rigidly fastened to the lower end of the housing (53) and to a second sheet metal (68), in the form of a truncated cone shape as well, fastened to the first sheet metal (67) by means of fastening elements (69). The strip (66) is implanted between the two sheet metals (67, 68) between which it is squeezed in order to follow closely the shape of the sheet metals (67, 68) and radially extends toward the outside of the windrowing rotor (46) down to the lower end (59) of the adjacent windrowing rotor (45). Note as well that the second sheet metal (68) is diametrically greater than the first sheet metal (67) so that it radially extends beyond the first sheet metal (67).

According to the example shown, the fastening elements (69) are made of bolts (70) that completely go through the sheet metals (67, 68) and the strip (66) made of flexible material.

It should be noted as well that the windrowing rotors (45, 46) are designed to rotate around respective rotation axes (71, 72) that are at least substantially vertical.

According to this example shown, the rotation axes (71, 72) of the windrowing rotors (45, 46) are at least substantially merging with the longitudinal axes (50, 51) of the cylindrical links (48, 49) linking the windrowing rotors (45, 46) to the carrying structure (33).

Furthermore, the windrowing rotors (45, 46) of a guiding element (42', 42") will be driven into rotation by means of a corresponding driving mechanism (73', 73"), preferably located above the windrowing rotors (45, 46), located above the carrying structure (33) that is fastened to the cutting mechanism (3) as it is shown in FIGS. 1 and 2.

According to this inventive idea, the windrowing rotors (45, 46) of the guiding elements (42', 42") are driven in rotation so as to windrow the forage toward the median plane (13) of the cutting mechanism (3).

To this effect, the windrowing rotors (45, 46) of the guiding element (42') rotate, as viewed from above, in a counter-clockwise rotation (74), and the windrowing rotors (45, 46) of the guiding element (42") rotate, as viewed from above, in a clockwise rotation (75).

Each driving mechanism (73', 73") includes a transmission belt (76', 76") that extends at least substantially horizontally above the carrying structure (33). To this effect, each windrowing rotor (45, 46) has a driving pulley (77, 78) located above the corresponding cylindrical link (48, 49). Note that the diameter of the driving pulley (77) of the windrowing rotor (45) is greater than the diameter of the corresponding housing (52), while the diameter of the driving pulley (78) of the windrowing rotor (46) is less than the diameter of the corresponding housing (53). Such a concept allows to obtain a peripheral linear speed of the windrowing rotor (46) located the closest to the median plane (13), that is greater than the peripheral linear speed of the windrowing rotor (45) located at the outermost of the cutting mechanism (3).

Note as well that each driving mechanism (73', 73") includes a tensioning pulley (80) designed to ensure a good tension of the corresponding transmission belt (76', 76").

The driving mechanism (73') of the guiding element (42'), located at the end (10') where the cutting mechanism (3) is driven, receives the movement directly from the transmission (14) that moves the cutting mechanism (3). To this effect, there is provided a driving pulley (81') designed to drive the transmission belt (76') of the driving mechanism (73'). The driving pulley (81') is fastened in a substantially concentric way to the upper exit shaft (19) of the first transmission device (16) by which it is driven in rotation.

Figure 5:
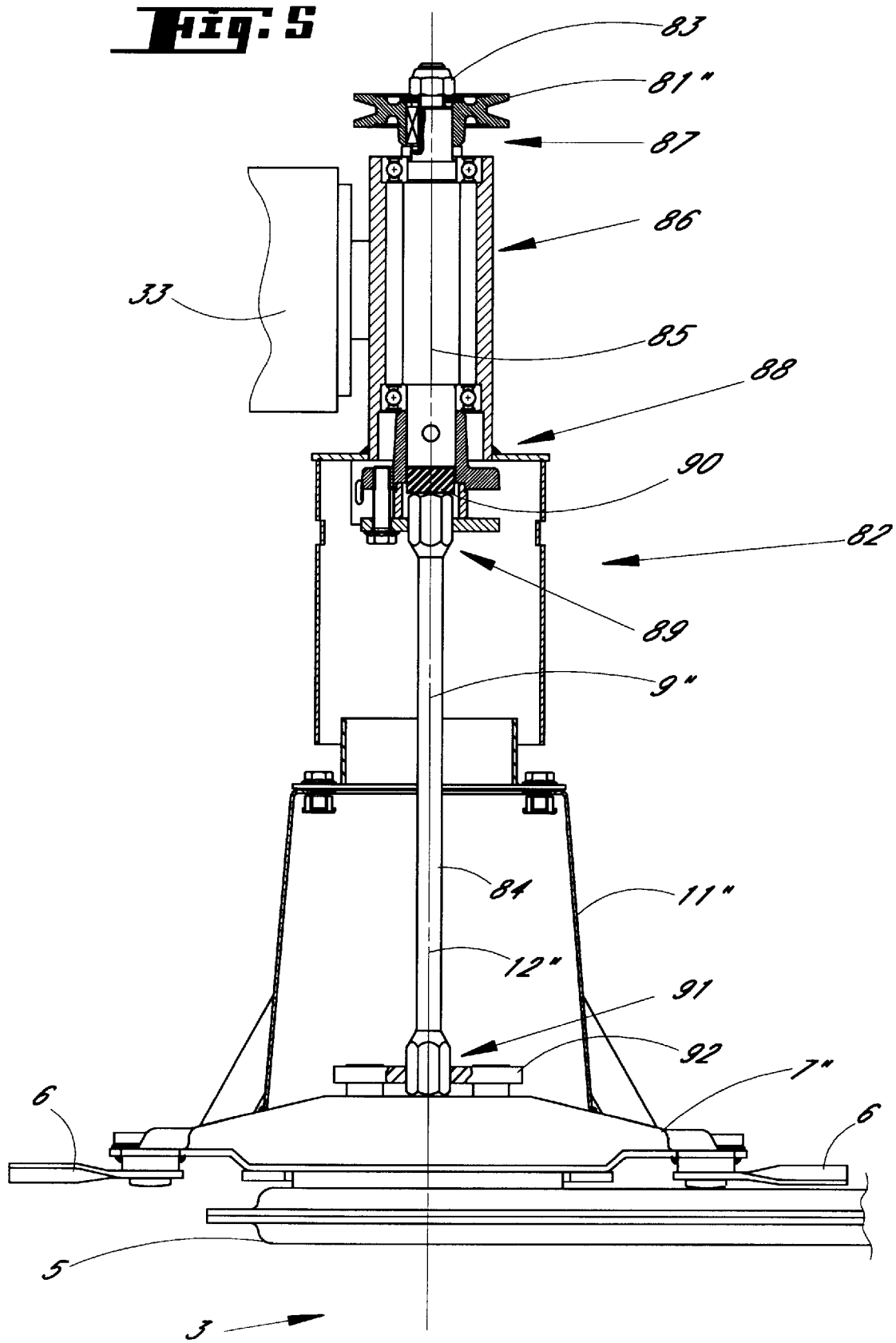
FIG. 5 represents, on a larger scale, a partial section by plane V defined in FIG. 2.

The driving mechanism (42") of the guiding element that is located at the other end (10") of the cutting mechanism (3) receives the movement directly from the cutting mechanism (3). To this effect, there is provided a second driving pulley (81") designed to drive the transmission belt (76") of the driving mechanism (73"). The second driving pulley (81") is driven in rotation by the cutting element (7") by means of a transmission (82) (FIG. 5) that includes two transmission shafts (83, 84). The transmission shaft (83), with a longitudinal axis (85) which at least substantially merges with the rotation axis (9") of the cutting element (7"), is linked to the carrying structure (33) by means of a cylindrical link (86). At the upper end (87) of the transmission shaft (83), the driving pulley (81") is fastened in a substantially concentric way. At the lower end (88) of the transmission shaft (83), the upper part (89) of the transmission shaft (84) is linked to it by means of an elastic link (90), and the lower end (91) of the transmission shaft (84) is linked to the cutting element (7") by means of a driving element (92) rigidly fastened to the cutting element (7").

Viewing FIG. 1, it can be additionally noted that each driving mechanism (73', 73") is covered by a hood (94) designed to protect the operator or other persons close by, and also to shield the driving mechanism (73', 73") from exterior elements like the cut product, rocks, etc. . .

Also note that the windrowing device (40) that is on the mower (1) according to the example shown here, is symmetrical in relation to the median plane (13) of the cutting mechanism (3).

The mower (1), as described above, operates as follows:

During work, the mower (1) is moved in an area that is covered with products to be cut. The plants are first neatly cut close to the ground by the cutting tools (6) of the cutting elements (7, 7', 7") driven in rotation by the transmission (14).

With this mower (1), not only is a perfect cut of the plants obtained, but also a good gathering of the product that has been cut by the cutting tools is obtained. Actually, during work, the product that is cut near the ends (10', 10") of the cutting mechanism (3) is deviated a first time by the cutting elements (7', 7") and their corresponding windrowing caps (11', 11"), which throw it directly to the windrowing rotor (45) without the cut product touching the ground. The windrowing rotor (45), by its rotation, throws the cut product onto the windrowing rotor (46) which, by its rotation, carries the cut product toward the median plane (13), so that it gathers all the cut product along the whole width that has been mowed by the mower (1) in a narrow windrow.

Note that from the moment when the product is cut by the cutting tools (6) of the corresponding cutting elements (7, 7', 7"), it is dropped to the ground only after having been gathered in a narrow windrow by the windrowing device (40), especially due to the location of the windrowing rotors (45, 46) which are located directly behind the cutting elements (7, 7', 7"), and to the lower part (65) of the windrowing rotor (46) which carries the cut product which extends around the lower end (60) of the windrowing rotor (46), and as well to the speed of advance at work.

Finally, different modifications are possible, especially concerning the constitution of various elements or by substitution of technical equivalents, without overriding the protection as defined in the claims.

It is especially perfectly imaginable to have a means of adjustment that would allow to move the windrowing rotors (45, 46) in height in order to be able to adjust their position in relation to the ground. To achieve it, it is perfectly conceivable to hang each windrowing rotor to the carrying structure (33) by means of a cylindrical link, flanged on the carrying structure (33).

It is also conceivable to arrange, according to a view toward the direction of work (4), the windrowing rotor (46) that is located the closest to the median plane (13) of the cutting mechanism (3) so that it substantially overlaps the windrowing rotor (45) that is located the furthermost outward.

According to the width of the cutting mechanism (3), it is perfectly conceivable to fit the mower (1) with a windrowing device that would have housings (52, 53) for the windrowing rotors (45, 46) with diameters that would be substantially equal. This way, when the cutting mechanism (3) has a relatively small width to operate, the windrowing device (40) could be fitted with four windrowing rotors (46) having housings (53), and when the cutting mechanism (3) has a relatively broad width, the windrowing device (40) could be fitted with four windrowing rotors (45) that would have housings (52).

It is also possible to equip the guiding element (42', 42") with three or more windrowing rotors, that would be arranged, in relation to each other, in a way similar to the one described above as an example of the represented realization.

Furthermore, it is perfectly possible to adopt this windrowing device (40) fitted with two guiding elements (42', 42") on a type of mower that is different from the one that has been shown in the different figures, like, for instance, on mowers with drums, with fingers, pulled mowers or semi-mounted mowers, etc. . .

When it is desirable to windrow the cut forage on only one end (10', 10") of the cutting mechanism (3), especially on mowers that extend laterally to the motor vehicle to which they are linked, it is perfectly conceivable to equip such a mower with only one guiding element (42', 42") which extends to the desired end (10', 10").

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower comprising:
   a linking structure designed to link the mower to a motor vehicle;
   a cutting mechanism having driven cutting elements comprising cutting tools; and
   a windrowing device designed to laterally move, toward a median plane of the cutting mechanism, a product that has been cut by the cutting elements before the cut product is dropped to the ground, said windrowing device having at least one guiding element for the cut product that is located in the vicinity at least of one of the lateral ends of the cutting mechanism, and when viewing in a direction of work, behind a front of a cut of the cutting mechanism, said at least one guiding element having at least two rotors that are located crosswise to the direction of the work and said at least two rotors each having a rotational axis directed upward during operation, said at least two rotors being hung to a carrying structure linked to the cutting mechanism, said at least two rotors being driven into rotation by means of a driving mechanism;
   wherein said at least two rotors are windrowing rotors that are arranged in an immediate vicinity of each other in order to obtain a good seal between the said at least two windrowing rotors and avoid cut product from lodging between said at least two windrowing rotors, said at least two windrowing rotors being solely hung to the carrying structure at their top, and a lower end of at least one of the said at least two windrowing rotors extends at least to a cutting plane defined by the cutting tools of the corresponding cutting elements.

2. The mower according to claim 1, wherein said at least two windrowing rotors of a same guiding element are arranged in relation to each other in such a way that a horizontal line, leaning against a front part of said at least two windrowing rotors, extends viewed from above toward a rear in a direction of the median plane of the cutting mechanism.

3. The mower according to claim 1, wherein when viewing in the direction of work, the windrowing rotor of said at least two windrowing rotors that is located closest to the median plane of the cutting mechanism is substantially tangent to the windrowing rotor of said at least two windrowing rotors that is located the furthermost outward.

4. The mower according to claim 1, wherein the windrowing rotor of said at least two windrowing rotors that is located the closest to the median plane of the cutting mechanism has a housing that is essentially directed upward and a lower part that is essentially radially directed outward.

5. The mower according to claim 4, wherein said lower part that is essentially radially directed outward extends to a lower end of an adjacent one of the said at least two windrowing rotors.

6. The mower according to claim 5, wherein said lower part that is essentially radially directed outward is in a shape of a truncated cone.

7. The mower according to claim 4, wherein the lower part of the windrowing rotor is made of a flexible material.

8. The mower according to claim 1, wherein the windrowing rotor of said at least two windrowing rotors that is located the furthermost outward has a housing that extends to a vicinity of trajectories that have been swept by the tools of the corresponding cutting elements.

9. The mower according to claim 1, wherein the rotation axis of the windrowing rotor of said at least two windrowing rotors that is located that furthermost outward extends in the vicinity of a vertical plane which is directed on one hand according to the direction of work and which extends, on the other hand, halfway between rotation axes of the corresponding cutting elements.

10. The mower according to claim 1, wherein an outer cutting element of said cutting elements, located at an end of the cutting mechanism where the at least one guiding element will be arranged, has a windrowing cap and when viewed in the direction of work, the corresponding windrowing rotor of said at least two windrowing rotors, located the furthermost outward, approximately overlaps said windrowing cap.

11. The mower according to claim 1, wherein the rotation axis of at least one of said at least two windrowing rotors is substantially vertical.

12. The mower according to claim 1, wherein said at least two windrowing rotors are movable in height by adjustment means.

13. The mower according to claim 1, wherein the windrowing rotor of said at least two windrowing rotors that is located the closest to the median plane of the cutting mechanism has a first housing, and the windrowing rotor of said at least two windrowing rotors that is located the furthermost outward has a second housing, each of the first and second housings of each windrowing rotor being substantially cylindrical.

14. The mower according to claim 13, wherein at least one of the first and second housings of at least one of said at least two windrowing rotors of said at least one guiding element has driving elements that are distributed in a substantially uniform fashion.

15. The mower according to claim 14, wherein said driving elements are driving ribs that extend at least substantially along a generating line of said one housing.

16. The mower according to claim 14, wherein at least the housing of the windrowing rotor that is located the closest to the median plane of the cutting mechanism is provided with driving elements.

17. The mower according to claim 1, wherein the peripheral linear speed of the windrowing rotor of said at least two windrowing rotors located the closest to the median plane of the cutting mechanism is greater than the peripheral linear speed of the windrowing rotor of said at least two windrowing rotors that is located the furthermost outward.

18. The mower according to claim 1, wherein the driving mechanism of said at least two windrowing rotors of the at least one guiding element is located above said at least two windrowing rotors.

19. The mower according to claim 18, wherein the driving mechanism is located above the carrying structure.

20. The mower according to claim 18, wherein the driving mechanism has a transmission belt that extends substantially horizontally.

21. The mower according to claim 1, comprising two guiding elements, each one of which is arranged at a corresponding lateral end of the cutting mechanism, said two guiding elements forming the windrowing device.

22. The mower according to claim 21, wherein the driving mechanism driving said at least two rotors of the guiding element of said two guiding elements that is located at the end where the cutting mechanism is driven receives a movement directly from a transmission that moves said cutting mechanism, while the driving element of the guiding element of said two guiding elements that is located at the other end of the cutting mechanism receives a movement from said cutting mechanism.

23. The mower according to claim 1, wherein, when viewing in the direction of work, the windrowing rotor of said at least two windrowing rotors that is located closest to the median plane of the cutting mechanism approximately overlaps the windrowing rotor that is located the furthermost outward.

* * * * *